United States Patent [19]

Kassai

[11] Patent Number: 4,637,093
[45] Date of Patent: * Jan. 20, 1987

[54] SPRING CUSHIONED CASTER HAVING A SPRING BIASED LOCKING MEMBER

[75] Inventor: Kenzou Kassai, Osaka, Japan

[73] Assignee: Aprica Kassai Kabushikikaisha, Osaka, Japan

[*] Notice: The portion of the term of this patent subsequent to Jun. 12, 2001 has been disclaimed.

[21] Appl. No.: 672,708

[22] Filed: Nov. 19, 1984

[30] Foreign Application Priority Data

Dec. 1, 1983 [JP] Japan .............. 58-185973[U]

[51] Int. Cl.⁴ .............................................. B60B 33/00
[52] U.S. Cl. ....................................... 16/35 R; 16/44
[58] Field of Search ............... 16/35 R, 44; 188/1.12

[56] References Cited

U.S. PATENT DOCUMENTS

| | | | |
|---|---|---|---|
| 2,972,163 | 2/1961 | Ross et al. | 188/1.12 X |
| 4,184,227 | 1/1980 | Propst et al. | 16/35 R |
| 4,349,938 | 9/1982 | Fontana | 16/35 R |
| 4,453,287 | 6/1984 | Kassai | 16/35 R |
| 4,491,335 | 1/1985 | Evron | 16/44 X |

FOREIGN PATENT DOCUMENTS

| | | | |
|---|---|---|---|
| 2218411 | 10/1973 | Fed. Rep. of Germany | 16/35 R |
| 2516516 | 10/1976 | Fed. Rep. of Germany | 16/35 R |
| 2500797 | 9/1982 | France | 16/35 R |

Primary Examiner—Fred Silverberg
Attorney, Agent, or Firm—W. G. Fasse; D. H. Kane, Jr.

[57] ABSTRACT

A caster wherein a rotary yoke (4) rotatably supporting a wheel (8) is supported by a vertically extending shaft (5) so that it is rotatable relative to a fixed bracket (3). The rotary yoke (4) is supported so that it is vertically movable relative to the fixed bracket (3) while overlapping the lower end of the latter. A cushion spring (6) downwardly urging the rotary yoke (4) is interposed between the fixed bracket (3) and the rotary yoke (4). Further, the caster is provided with a locking mechanism (10) for selectively stopping the inherent function of the caster of changing the direction of travel of the wheel.

5 Claims, 16 Drawing Figures 4,637,093

SPRING CUSHIONED CASTER HAVING A SPRING BIASED LOCKING MEMBER

BACKGROUND OF THE INVENTION

This invention relates to a caster and particularly to improvements for simplifying the construction of a caster having a cushioning effect.

To facilitate changing the movement direction, casters are sometimes attached to transport devices such as baby carriages or to objects to be moved. Generally, casters comprise a fixed bracket to be fixed to an object to be moved with the aid of the caster, a rotary yoke supported for rotation around a vertically extending axis relative to the fixed bracket, and a wheel rotatably supported by the rotary yoke on a horizontal axis disposed at a position horizontally deviating from said vertical axis.

What is demanded of such caster particularly in a baby carriage, is to exert a cushioning effect in the wheel. To this end, in the past, a cushion spring has been installed to act between the rotary yoke and the axle of the wheel. For example, the axle, rather than being attached directly to the rotary yoke, is held by a wheel attaching member urged in a desired direction by a cushion spring, the axle being held by the rotary yoke through said wheel attaching member.

However, such conventional typical cushioned caster requires separate parts, such as the wheel attaching member, for providing a cushioning effect, so that the number of parts correspondingly increases, forming an obstacle to simplification of the caster. Further, the function of the wheel attaching member is not always assured, sometimes failing to achieve the desired result. Moreover, the cushioning mechanism is liable to go wrong.

SUMMARY OF THE INVENTION

Accordingly, an object of this invention is to provide a caster which is simple in construction and can exert a stable cushioning effect.

Noticing the presence of the vertically extending shaft originally provided in a caster for rotatably supporting the rotary yoke with respect to the fixed bracket, the present invention is intended to install a cushion spring in the connecting area where the fixed bracket and the rotary yoke are connected together by said shaft.

More particularly, the caster of this invention basically comprises a fixed bracket to be secured to an object to be moved by the caster, a vertically extending shaft held by said fixed bracket, a rotary yoke held by said shaft and thereby supported for rotation around a vertical axis relative to said fixed bracket, and a wheel rotatably supported by the rotary yoke on a horizontal axis disposed at a position horizontally deviating from said shaft. Noteworthy features are that the rotary yoke is supported so that it is vertically movable relative to the fixed bracket while overlapping the lower end of the fixed bracket, and that a cushion spring downwardly urging the rotary yoke is interposed between the fixed bracket and the rotary yoke.

In addition, in a preferred embodiment of the invention, a mechanism is added which is capable of selectively stopping the inherent function of a caster of automatically changing the direction of travel of the wheel.

According to this invention, a cushioned caster is provided by installing a cushion spring between the fixed bracket and the rotary yoke which are connected together. The cushion spring acts between the fixed bracket and the rotary yoke, while allowing a vertical movement of the rotary yoke along the shaft with respect to the fixed bracket. Thus, the fixed bracket, shaft and rotary yoke are assembled in such a relation as to not only allow them to perform their inherent functions, but also provide a cushioning effect. Therefore, a desired cushioned caster can be obtained by adding a cushion spring without increasing the number of other parts.

These objects and other objects, features, aspects and advantages of the present invention will become more apparent from the following detailed description of the present invention when taken in conjunction with the accompanying drawings.

DETAILED DESCRIPTION OF PREFERRED EXAMPLE EMBODIMENTS AND OF THE BEST MODE OF THE INVENTION

Figure 1:
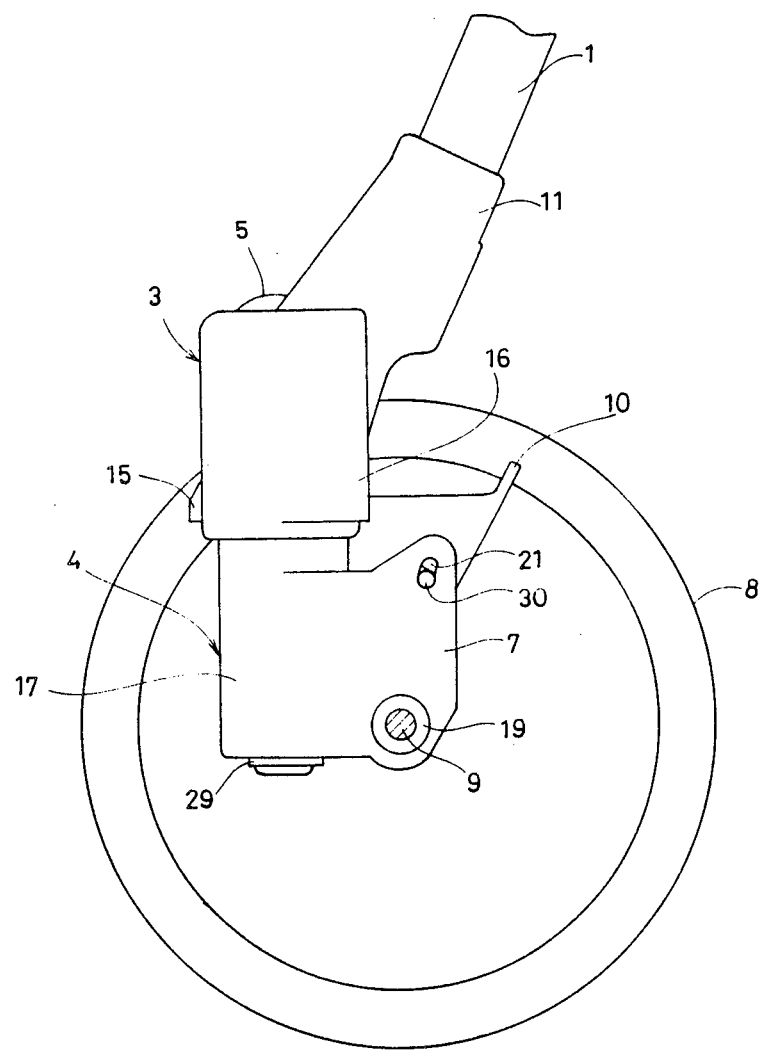
FIG. 1 is a front view of an embodiment of this invention.
Figure 2:
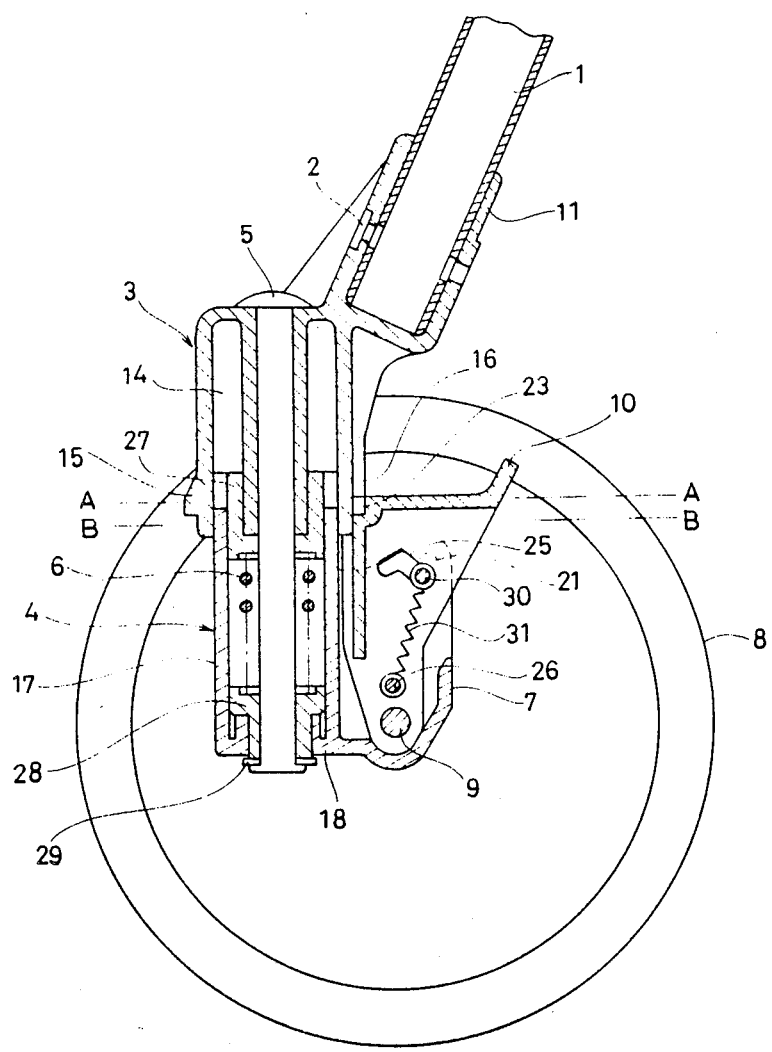
FIG. 2 is a central vertical sectional front view of the caster of FIG. 1.
Figure 14:
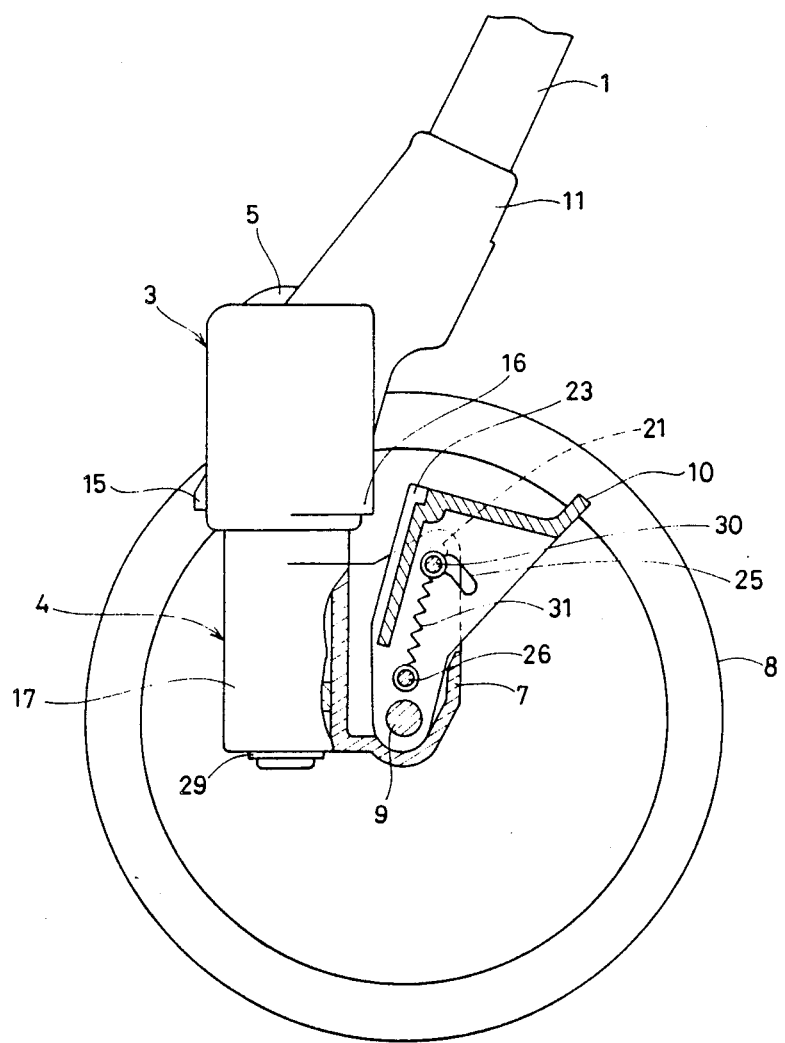
FIG. 14 is a partly sectional front view of the caster of FIG. 1, showing a state in which the locking action of the locking lever 10 has been removed.

This embodiment illustrates a case where casters are attached to the lower end of the front legs of a baby carriage as shown in FIGS. 1, 2 and 14.

Figure 3:
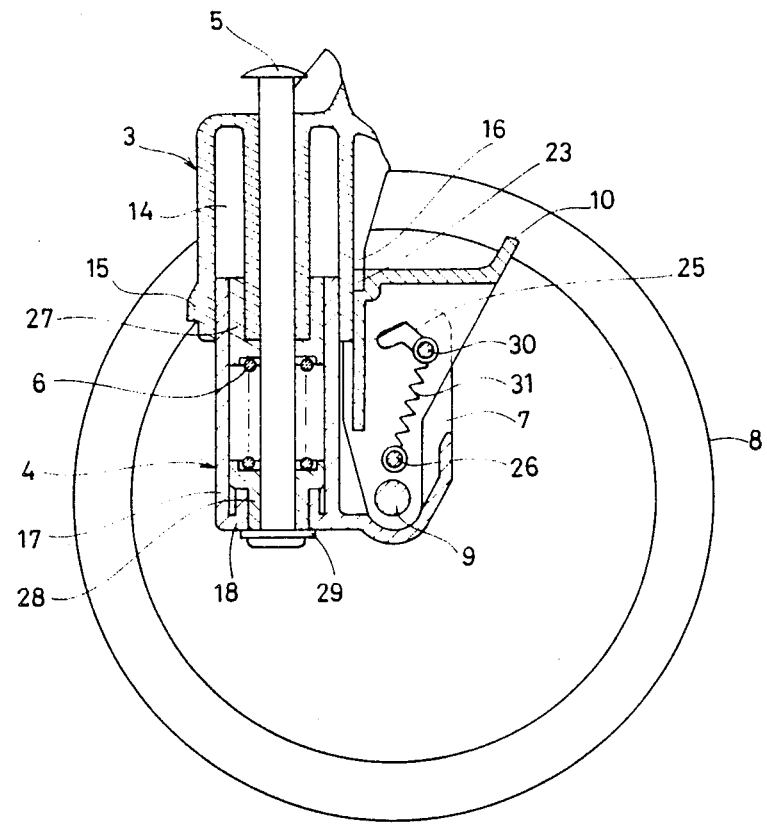
FIG. 3 is a vertical sectional front view similar to FIG. 2, but showing a state in which a cushioning effect is in action.
Figure 4:
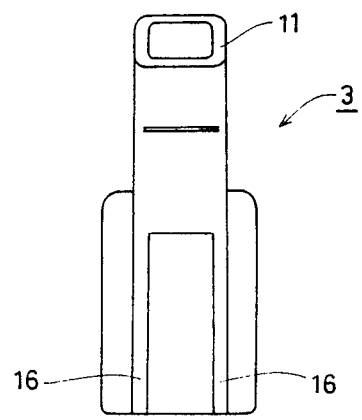
FIG. 4 is a right-hand side view showing a fixed bracket 3.

Referring to FIGS. 1 through 3, the lower end of the front leg 1 has a fixed secured bracket fixed thereto by rivets 2. A rotary yoke 4 is positioned in the lower region of the fixed bracket 3. The rotary yoke 4 is supported by a vertical shaft 5 so that it is rotatable around a vertical axis relative to the fixed bracket 3. As is clear from a comparison of FIGS. 2 and 3, the rotary yoke 4 is supported so that it is vertically movable relative to the fixed bracket 3 while overlapping the lower end of the latter. To make use of this vertical movement to create a cushioning effect, a cushion spring 6 in the form of a compression spring downwardly urging the rotary yoke 4, is installed in the rotary yoke 4 and between the fixed bracket 3 and the rotary yoke 4. The rotary yoke 4 is formed with a bearing bracket portion 7 defining two laterally extending parallel walls. An axle 9 rotatably supporting a wheel 8 is positioned in the bearing bracket portion 7. Thereby, the axle 9 is brought to a position horizontally deviating from the shaft 5. A locking lever 10 is disposed between the two parallel walls of the bearing bracket portion 7 and is rotatably supported as by the axle 9. The locking lever 10 will be operated when it is desired to stop the inherent function of the caster.

The details and relations of said parts will now be described using figures separately showing these parts.

Figure 5:
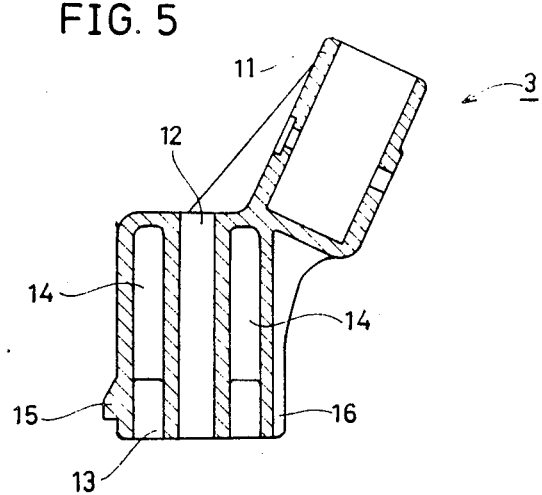
FIG. 5 is a central sectional front view of the fixed bracket 3.
Figure 6:
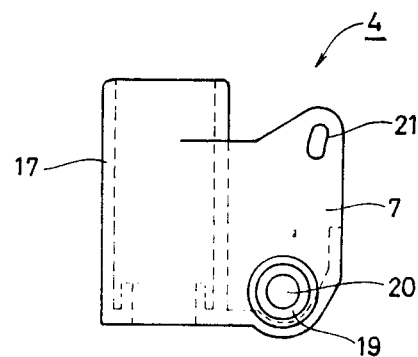
FIG. 6 is a front view of a rotary yoke 4.

The fixed bracket 3 has an obliquely upwardly extending sleeve portion 11 for receiving the lower end of the front leg 1. The body portion of the fixed bracket 3 has a vertically extending circular throughgoing hole 12 for insertion of the shaft 5. Further, the bracket 3 has an annular opening 13 in its lower end around the throughgoing hole 12. A plurality of ribs 14 are formed in the innermost region of the opening 13. The front side (or left-hand side in FIG. 5) of the fixed bracket 3 has an engaging projection 15. The rear side of the fixed bracket 3 has engaging ribs 16 defined by two vertically extending parallel ribs.

Figure 7:
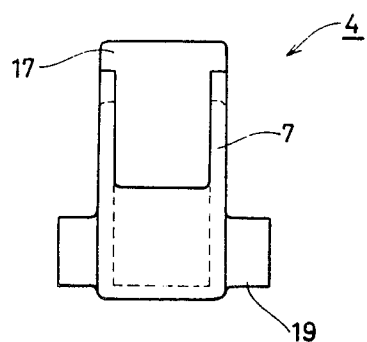
FIG. 7 is a right-hand side view of the rotary yoke 4.
Figure 8:
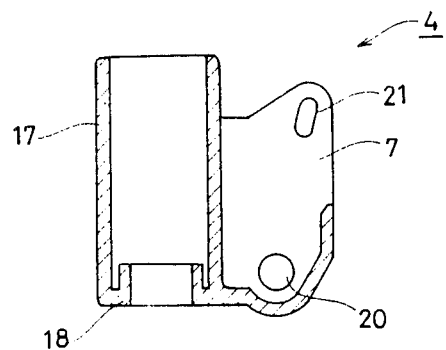
FIG. 8 is a central vertical sectional front view of the rotary yoke 4.
Figure 9:
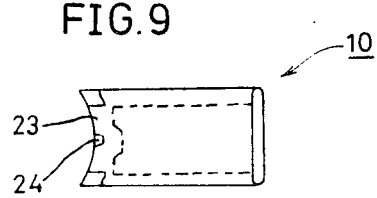
FIG. 9 is a plan view of a locking lever 10.
Figure 10:
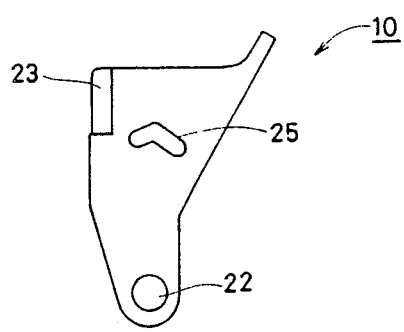
FIG. 10 is a front view of the locking lever 10.
Figure 11:
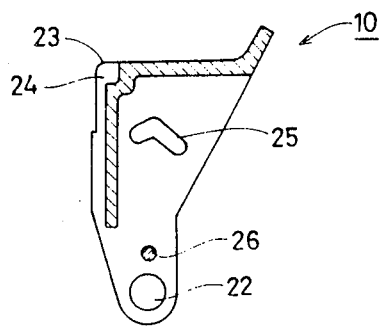
FIG. 11 is a central vertical front view of the locking lever 10.

The rotary yoke 4 has a body portion 17 with an inner cylindrical surface, and said bearing bracket portion 7 extends laterally from the body portion 17. The lower end of the body portion 17 has a bearing 19 for receiving said axle 9, and a bearing hole 20 extends through said bearing 19. In addition, as is clear from FIG. 7, the bearing 19 is provided on each of opposite sides of the bearing bracket 7 for supporting two wheels on the opposite ends of the axle 9 in such a manner that the illustrated wheel 8 and another wheel not shown hold the rotary yoke 4 therebetween. The upper portion of the bearing bracket 7 has an elongated locking hole 21 extending in the direction toward the bearing hole 20.

The lower end of the locking lever 10 has a throughgoing hole 22 which, when aligned with the bearing hole 20, receives the axle 9 to support said locking lever 10 for rotation relative to the bearing bracket portion 7. The front upper portion of the locking lever 10 is provided with an engaging portion 23 having a width correlated with the distance between the two ribs 16. The middle of the engaging portion 23 has an engaging recess 24 for cooperation with said engaging projection 15 so that they can engage each other. Further, the locking lever 10 has an elongated angled guide hole 25. A stop pin 26 is positioned between the elongated guide hole 25 and the throughgoing hole 22 so as to connect the two lateral walls of the locking lever 10.

Again referring to FIGS. 1 to 3, assembling the parts will now be described. A spring seat 27 is inserted into the open bottom opening 13 in the fixed bracket 3 and positioned to abut against the ribs 14. Further, the shaft 5 is inserted into the throughgoing hole 12 (FIG. 5) of the fixed bracket 3. The cushion spring 6 is disposed around the shaft 5 with its upper end abutting against the spring seat 27. A spring stopper 28 is fitted on the lower end of the shaft 5 so that it abuts against the lower end of the cushion spring 6. The body portion 17 of the rotary yoke 4 is inserted into the opening 13 in the fixed bracket 3 and then a washer 29 is fitted on the lower end of the shaft 5, whereupon the lower end of the shaft 5 is crimped, thereby preventing the parts arranged around the shaft 5 from slipping off.

When this assembly operation is completed, the rotary yoke 4, held by the shaft 5, is supported for rotation around a vertical axis relative to the fixed bracket 3 and also for vertical movement relative to the fixed bracket 3 while overlapping the lower end of the fixed bracket 3. Since the cushion spring 6 acts between the fixed bracket 3 and the rotary yoke 4, a force downwardly urging the rotary yoke 4 is exerted by the cushion spring 6.

The locking lever 10 is supported by the axle 9 for rotation relative to the bearing bracket portion 7 of the rotary yoke 4. In this state, an engaging pin 30 is passed through the elongated engaging hole 21 of the bearing bracket portion 7 and the elongated guide hole 25 of the locking lever 10. A tension spring 31 is connected between the engaging pin 30 and the stop pin 26.

How to use this embodiment and how it operates will now be described.

Figure 12:
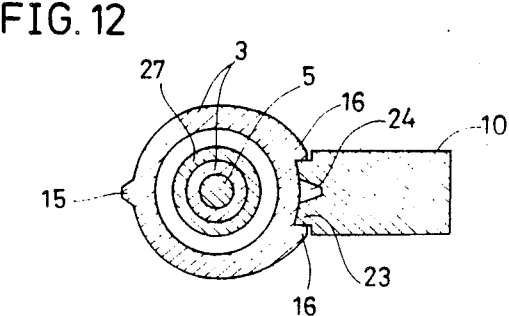
FIG. 12 is a sectional end view taken along the line A—A of FIG. 2.
Figure 13:
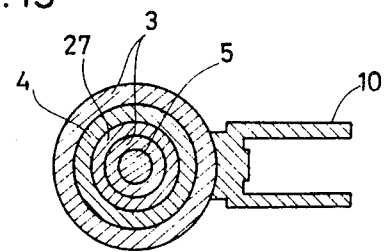
FIG. 13 is a sectional end view taken along the line B—B of FIG. 2.

FIGS. 1 to 3 show a state in which the cushioning effect alone is in action while the inherent function of the caster to rotate is stopped. In this state, the engaging portion 23 of the locking lever 10 is engaged between the engaging ribs 16 formed on the fixed bracket 3, thereby inhibiting rotation of the rotary yoke 4 around the shaft 5. FIG. 12 is a sectional end view taken along the line A—A of FIG. 2, and FIG. 13 is a sectional end view taken along the line B—B of FIG. 2. The aforesaid engaged state can be easily understood particularly with reference to FIG. 12.

Even in this state in which the engaging portion 23 is fitted between the two engaging ribs 16, the engaging portion 23 can be slid along the wall surface of the fixed bracket 3 while maintaining its engagement with the engaging ribs 16; thus, the cushioning effect is retained as such. This will be clear from a comparison of FIGS. 2 and 3.

FIG. 14 shows, partly in section, the state of disengagement of the engaging portion 23 from the engaging ribs 16. This state can be established by turning the locking lever 10 so as to displace the upper end of the locking lever 10 backward (rightward in FIG. 14). In response thereto, the engaging pin 30 is pushed up against the force of tension spring 31 from one end of the elongated guide hole 25 along the contour of the latter, and when the engaging pin 30 passes such unstable state, it is positioned at the other end of the elongated guide hole 25. In addition, the elongated engaging hole 21 of the bearing bracket portion 7 guides the engaging pin 30 as the latter moves toward and away from the axle 9; thus, the posture of the locking lever 10 is stabilized in the state (FIG. 2) in which the engaging pin 30 is positioned at one end of the elongated guide hole 25 and also in the state (FIG. 14) in which it is positioned at the other end.

If the locking lever 10 is turned to move its upper end forward, the state shown in FIG. 2 in which the engaging portion 23 engages the engaging ribs 16 is reestablished. In addition in the engaged state shown in FIGS. 1 to 3, the wheel 8 is aligned with the direction of travel of the baby carriage.

Figure 15:
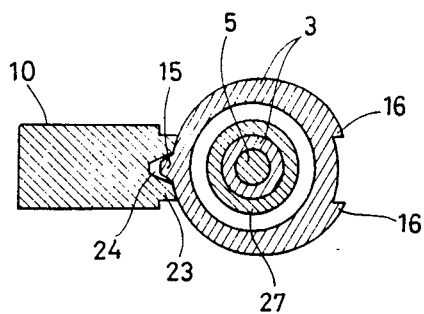
FIG. 15 is a view corresponding to FIG. 12, showing a state in which a wheel 18 has made a 180° directional change, as compared with FIG. 12.

Even if the wheel 8 in the state of FIG. 14 is turned through 180° around the shaft 5, the locking mechanism is still effective in stopping the inherent function of the caster. In the sectional end view of FIG. 15 the engaging projection 15 on the fixed bracket 3 fits in the engaging recess 24 of the locking lever 10. The method of operating the locking lever 10 to obtain such state is the same as described above. In addition, the locked state shown in FIG. 15 is mechanically weaker than the locked state obtained by the engaging portion 23 fitting between the engaging ribs 16 as shown in FIG. 12, and hence the locking could be naturally cancelled if the wheel 8 receives a great shock. In this sense, the locked state of FIG. 15 is not suitable for use during the travel of the baby carriage. However, the locked state of FIG. 15 makes an advantageous way of use possible, as described below.

Figure 16:
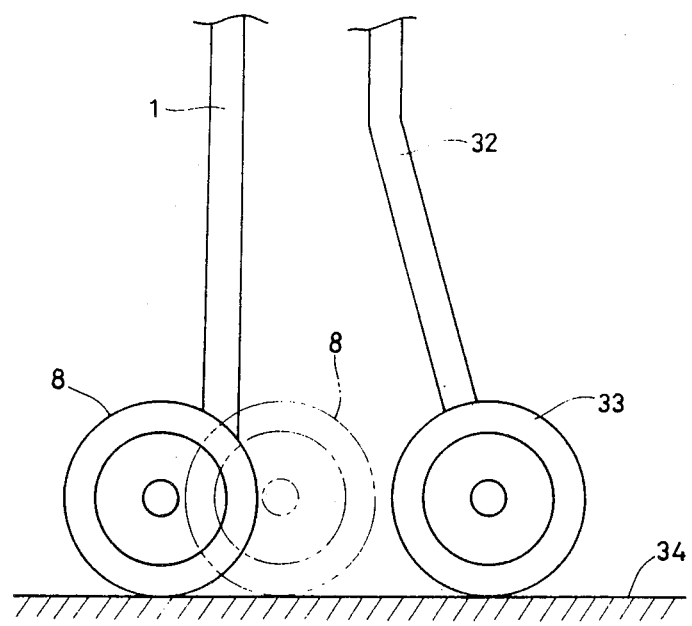
FIG. 16 shows the folded state of a baby carriage to which this embodiment is applied.

FIG. 16 may be considered to illustrate only the lower end of the baby carriage in its folded state. A certain type of baby carriage is so constructed that when it is folded, the front and rear legs 1 and 32 move toward each other while the wheels 8 and 33 attached to their respective lower ends are lined up, thereby enabling the baby carriage to stand by itself on the ground 34. In this case, to stabilize the self-standing state, it is preferable to position the wheel 8 as remote as possible from the other wheel 33, as shown in solid lines, as compared to establishing the state shown in phantom lines. In order to fix the state of the wheel shown in solid lines, the locked state shown in FIG. 15 acts advantageously. Since the locked state of FIG. 15 has only to serve to enable the baby carriage in its folded state to stand stably by itself, there is no need for the locked state to be very firm.

So far, the invention has been described in connection with the illustrated embodiment, but the latter is merely a preferred embodiment and the scope of the invention is as described in claim 1. Thus, it is to be pointed out that the mechanism for stopping the inherent function of the caster body including the locking lever is not an essential constituent of the invention.

What is claimed is:

1. A caster comprising: a fixed bracket (3) to be attached to an object (1) for rolling the object with the aid of the caster, a vertically extending shaft (5) held by said fixed bracket (3), a rotary yoke (4) supported by said shaft (5) for rotation around a vertically extending axis relative to said fixed bracket (3) and for vertical movement relative to the fixed bracket (3), said fixed bracket (3) comprising a lower end and an opening (13) in said lower end of said fixed bracket, said rotary yoke (4) having an upper end received in a telescoping manner in said opening (13) in said lower end of said fixed bracket for supporting said rotary yoke for vertical movement of said rotary yoke (4) relative to said fixed bracket (3), said rotary yoke having a laterally extending bearing bracket (7), a cushion spring (6) acting between said fixed bracket (3) and said rotary yoke (4) for downwardly urging said rotary yoke, a horizontally extending axle (9) supported in said bearing bracket (7) at a position horizontally spaced from said vertical shaft (5), said caster further comprising a locking lever (10) supported on said horizontally extending axle (9), said axle (9) forming a journal shaft for said locking lever (10) in said bearing bracket (7) of said rotary yoke (4), whereby said locking lever (10) is rotatable in a predetermined range about said journal shaft into a locking engagement with said fixed bracket (3) for preventing rotation of the rotary yoke (4) around said vertically extending axis, said locking lever and said fixed bracket comprising cooperating relative rotation preventing members permitting a vertical movement of said rotary yoke in response to a cushioning action of said cushion spring.

2. The caster of claim 1, wherein said rotary yoke encloses a space surrounding said vertical shaft (5), said cushion spring (6) being received in said space for providing a cushioning effect.

3. The caster of claim 1, wherein said rotation preventing members comprise two portions (15 and 16) at which said locking lever (10) engages said fixed bracket (3).

4. The caster of claim 1, further comprising an engaging pin (30) extending through said locking lever (10) and said bearing bracket (7), spring means (31) for urging said engaging pin (30) normally in a direction toward said axle (9), said bearing bracket having an elongated locking hole (21) for receiving said engaging pin (30) and for guiding said engaging pin so that said engaging pin moves only toward and away from said axle (9), said locking lever (10) having an elongated guide hole (25) extending over a range allowing said locking lever to assume states for engagement and disengagement with a portion of said fixed bracket (3) when said engaging pin (30) is received in said guide hole, said guide hole having a shape for bringing said engaging pin (30) to an unstable state when moving said engaging pin between said states of engagement and disengagement away from said axle (9) against the force of said spring (31).

5. The caster of claim 1, wherein said object is a baby carriage.

* * * * *